United States Patent [19]

Duncan

[11] 4,167,550
[45] Sep. 11, 1979

[54] METHODS OF MANUFACTURE OF BETA-ALUMINA

[75] Inventor: James H. Duncan, Stafford, England

[73] Assignee: Chloride Silent Power Limited, London, England

[21] Appl. No.: 870,535

[22] Filed: Jan. 18, 1978

[51] Int. Cl.$^2$ .................. C04B 35/10; C01F 7/04
[52] U.S. Cl. .................. 264/66; 423/600; 429/191; 429/193
[58] Field of Search ........... 423/600; 264/66; 429/191, 193

[56] References Cited

U.S. PATENT DOCUMENTS

| | | | |
|---|---|---|---|
| 2,580,635 | 1/1952 | Winter, Jr. | 55/72 X |
| 2,897,918 | 8/1959 | Schlotthauer et al. | 55/72 X |
| 3,443,360 | 5/1969 | Reeves | 55/71 |
| 3,509,057 | 4/1970 | Greger | 264/66 |
| 3,707,589 | 12/1972 | Chiku et al. | 264/66 |
| 3,880,971 | 4/1975 | Pantanelli | 264/66 |
| 3,903,225 | 9/1975 | Jones et al. | 264/66 |
| 3,950,463 | 4/1976 | Jones | 264/66 |
| 3,968,050 | 7/1976 | Riegel | 423/493 |
| 3,998,939 | 12/1976 | Mason et al. | 423/600 |
| 4,024,214 | 5/1977 | Foster et al. | 423/600 |
| 4,052,538 | 10/1977 | Eddy et al. | 423/600 |
| 4,059,663 | 11/1977 | Miles et al. | 264/65 |
| 4,064,209 | 12/1977 | Desplanches et al. | 264/66 |
| 4,070,542 | 1/1978 | Miles et al. | 264/65 |

*Primary Examiner*—Herbert T. Carter
*Attorney, Agent, or Firm*—Beveridge, DeGrandi, Kline & Lunsford

[57] ABSTRACT

In the manufacture of beta-alumina, particularly for use as a solid electrolyte in an electro-chemical cell or other energy conversion device, a compact of beta-alumina particles or of particles which react together on heating to form beta-alumina is sintered in a succession of cycles of heating and cooling such that not less than 5% and not more than 95% of the overall linear shrinkage takes place in any one cycle.

34 Claims, 4 Drawing Figures

METHODS OF MANUFACTURE OF BETA-ALUMINA

BACKGROUND OF THE INVENTION

1. Field of the Invention

This invention relates to methods of manufacture of beta-alumina.

2. Prior Art

Beta-alumina and its various derivatives are polycrystalline oxide ceramic materials that can be used as solid electrolytes in energy conversion devices using a liquid alkali metal. Such liquid alkali metal energy conversion devices are well known. In brief, they comprise a first electrode chamber containing a liquid alkali metal, a solid alkali cationically conductive impervious polycrystalline solid electrolyte separator membrane forming at least in part, the bounding wall of the first electrode chamber, and a second electrode chamber containing an electrode structure from which alkali metal ions can exchange from the solid electrolyte, which also forms in part the bounding wall of the second electrode chamber. A sodium sulphur cell is a typical example of such an alkali metal energy conversion device.

The chemical composition of beta-alumina is approximately 90% of aluminium oxide $Al_2O_3$, with approximately 10% of the oxide of an alkali metal, typically sodium oxide, whose ions are diffusible with respect to the beta-alumina polycrystalline lattice (all percentage compositions in this specification and claims are percentages by weight). The structure of beta-alumina crystals is characterised by particular X-ray diffraction patterns, and at least four different types known as $\beta$, $\beta''$, $\beta'''$ and $\beta''''$ have been described in the technical literature. The $\beta$ and the $\beta''$ type appear to be the most useful modifications for solid electrolyte applications. Often a useful electrolyte is formed of a mixture of the $\beta$ and $\beta$ types. Small additions of dopants such as magnesium oxide or lithium oxide have been used to increase the formation of the more conductive BP variant. Mixed additions of lithium oxide and magnesium oxide have also been used.

The production of a polycrystalline beta-alumina article from a compact of powdered materials using a heating cycle is well known. The article is usually heated to a temperature in excess of 1000° C., at a constant rate of temperature rise, typically 100° to 200° C. per hour. When the sintering temperature has been reached it is maintained for a period in excess of ten minutes, but often for a period of several hours and then allowed to cool. Cooling may be at the natural rate or may be set to a controlled rate using special control equipment.

More recently, for the sintering of alphaalumina, modified time temperature profiles have been used. Rather than maintaining a constant rate of temperature increase until the sintering temperature is reached, followed by a fixed interval at the sintering temperature the heating rate is progressively reduced as the sintering temperature is approached. This method of heating reduces the rate of densification of the ceramic compact. It is possible to use a transducer in physical contact with a powder compact to measure the rate of shrinkage, and to use the transducer in combination with electronic controllers to control the power input to the furnace. Using this technique the sintering process may be controlled with respect to the rate of densification and the total amount of densification that takes place. These methods have been used in place of the more usual methods where the rate of temperature increase and the time for which the maximum sintering temperature is maintained are controlled.

By coincidence there are similarities between the time/temperature cycles of rate controlled sintering and constant power heating schedules that are used commercially. In both cases the rate of temperature rise declines as the maximum temperature is approached.

More recently a new method of sintering has been described. See for example U.S. Pat. Nos. 3,903,225, 3,950,463, 4,059,663 and 4,070,542. This is known as fast pass-through sintering or fast zone sintering. This is used where the sintering is scheduled to take place in a short time interval, typically in less than 10 minutes. Often such sintering is completed in a time interval of less than 2 minutes. When such short time intervals are used it is not practical to sinter large amounts of material in a single batch. Heat transfer problems lead to difficulties with the specification of a precise time temperature profile throughout the bulk of large furnaces for short firing cycles. The material is passed continuously through a previously heated furnace. The furnace has an appropriately specified temperature profile between the entrance and the exit so that the articles pass through a prescribed heating and cooling schedule. Often the articles that are to be sintered are bigger in at least one dimension than is the heated zone of the furnace. Thus, as the articles pass through the furnace they experience a large temperature difference between different parts. Fast pass-through furnaces are most convenient for the manufacture of thin-walled ceramic tubes. Conveniently the tubes are moved axially through a tubular furnace, which has a heated zone at its centre. Often the temperature versus length profile of such tube furnaces is parabolic at the centre of the hot zone. Thus an article is subjected to a parabolic temperature versus time cycle when it is passed through the furnace. The rate of heating decreases progressively as the maximum temperature is approached. Conveniently the furnace tube is rotated and this can be used to transmit rotation to the article that is being sintered as it passes through the furnace. Rotation means may also be provided by known methods at the entry and exit when the tubes that are being sintered are about the same length as the furnace tube.

The use of multiple heating cycles is known in the manufacture of oxide ceramics. Bisque firing prior to sintering is a known practice in the manufacture of certain hard paste procelain. This heating is carried out before the sintering heat cycle. It is used in part to eliminate volatiles. Re-heating subsequent to sintering is also known in the art of pottery manufacture for example, during glazing. In this case multiple heating may be used to obtain special effects.

Multiple heating cycles are also known during the production and subsequent use of polycrystalline oxide ceramic solid electrolytes in energy conversion applications. Prior to fast firing, ceramic tubes may be subjected to a bisque firing cycle up to about 1000° C. to remove volatiles, and to improve the strength of the ceramic compact prior to sintering in a rapid pass-through furnace. Subsequent to sintering the solid electrolyte tube may be re-heated and subjected to an annealing schedule for a period of between 1 hour and 24 hours at a temperature at least 50° C. below the normal sintering temperature.

However, in all known methods of manufacturing beta-alumina ceramic articles the densification of the powder compact to form the impermeable polycrystalline cationically conductive ceramic article takes place in the course of one heating and cooling cycle in which the article is monotonically heated to a maximum temperature, held at a maximum temperature and then cooled subsequently. All of the shrinkage that accompanies the densification takes place in a single cycle of heating followed by cooling.

Although good quality electrolytes can be produced by the known methods that have been described, there are problems relating to the maintenance of a uniform grain structure. Beta-alumina ceramic articles are particularly susceptible to the development of inferior, duplex, grain structures in which larger elongated grains are formed within the matrix of fine grains. By close control of the process variables the methods that have been described previously may be used, but it is difficult to obtain in practice the very fine control that is required. Even greater difficulties are encountered when the known methods are used to produce ceramic electrolyte with exceptionally low resistivity. When it is necessary to obtain a high power density in a solid electrolyte energy conversion device, it is helpful to minimise the electrolyte resistivity. It then becomes necessary to maximise the formation of the $\beta''$ variant of beta-alumina during sintering. It is found that known methods are particularly difficult for the production of high conductivity materials, that have a fine uniform microstructure and a high durability in a cell.

SUMMARY OF THE INVENTION

According to the present invention, a method of manufacturing an impervious polycrystalline cationically conductive beta-alumina article comprises the step of densifying by sintering a compact of beta-alumina particles or a compact of particles that react together on heating to form beta-alumina in the course of a succession of cycles of heating followed by cooling such that not more than 95% of the overall linear shrinkage takes place during any one cycle of heating followed by cooling. Preferably at least 5% of the overall linear shrinkage occurs in each cycle of heating and cooling for densifying the compact.

The practice of quantifying the densification during sintering by measuring the linear shrinkage of the article is known. A generally accepted definition of linear shrinkage is the difference between the length of the powder compact and the length of the sintered ceramic article divided by the length of the powder compact. This definition will be adhered to throughout this specification. However, the amount of densification can be quantified by other measurements, such as the volume shrinkage or the change in porosity. All are related to linear shrinkage by simple algebraic expressions. Further details may be obtained from the 2nd Edition of Elements of Ceramics by F. H. Norton, Addison Wesley 1974 particularly pages 119 and 120, 134–136, 140–143.

The densification that takes place when a ceramic body is fired may be conveniently measured continuously during a heating cycle by means of a recording dilatometer as described on page 135 of Elements of Ceramics by Norton. Alternatively the densification may be measured by recording the length of a sample before and after sintering. Thus the shrinkage may be plotted against the firing temperature. This produces a characteristic function for the firing of many different types of ceramic materials in conventional equipment where the overall heating and cooling cycle takes about 24 hours and the soak time at the maximum temperature lies in the range 1–10 hours. In such firing cycles, it is found that the shrinkage is most sensitive to the temperature. Sensitivity to the time at any particular temperature is a second order effect.

The effect of time becomes more obvious when ceramic materials are produced by the fast firing pass-through methods. The time at each particular temperature can be reduced by a factor of 100 or more from the times of conventional methods.

Thus complete densification can take place at different temperatures provided that the time interval is adjusted.

Thus, in accordance with a preferred form of this invention a first temperature versus time heating and cooling profile is chosen in which more than 5% but less than 95% of the shrinkage required for mature densification takes place. This heating cycle may be selected as a result of experimental determination of the time temperature profiles. The profile may be selected for a batch firing method or for a pass-through method.

When compacts of mixtures of powder that react together before or during sintering to form beta-alumina are used, the linear shrinkage required to produce mature densification is about 12%. Thus, in this instance the first relevant heating and cooling cycle of the method would produce between 0.6% and 11.4% linear shrinkage. Subsequent heating and cooling cycles would be used to bring about the remaining linear shrinkage of between 11.4% and 0.6%.

When compacts are formed from pre-reacted powders, the amount of linear shrinkage is somewhat higher, typically between 15% and 20%. At 20% overall linear shrinkage the 5% minimum corresponds to a linear shrinkage of 1% and the 95% maximum to a linear shrinkage of 19%.

It has been found that firing cycles subsequent to that defined above may have temperature time cycles which, in the absence of previous cycles that bring about partial densification, would themselves result in the mature densification of the powder compact.

It is convenient to carry out a set of densification cycles in the same furnace. In the fast pass-through method this may be achieved by passing tubes twice through the same furnace. The speed of traverse or the hot zone profile may be adjusted between each pass. Alternatively, the profile may be arranged by appropriate design of heating arrangements so that ware passed through the furnace is heated then cooled then heated and cooled again. When the latter arrangement is used, the cooling after the first temperature maximum should be at least 25° C. and is preferably in excess of 50° C. Greater amounts of cooling may be used. A partially densified compact is thermally stable at temperatures below about 1200° C. so that it is not necessary to be specific about this part of the thermal specification. However, precautions must be taken to avoid the long term exposure of partially densified compacts to the atmosphere at temperatures below 1000° C. The compacts are hygroscopic and they absorb moisture from the ambient atmosphere.

In the batch firing process where the compacted articles are encapsulated in platinum or in alkali resistant refractories, the time temperature profiles that are suitable for this invention are determined empirically. A first heating and cooling cycle that causes incomplete densification is specified. A furnace controller is provided that heats the ceramic powder compact through this first heating cycle, cools the compact by at least 25° C. from the first temperature maximum and then reheats the sample to a second temperature maximum to complete the densification.

In accordance with another aspect of this invention the various stages of densification may be carried out in different furnaces. The first densification may take place in a batch type process while the further densification stages take place in a pass-through furnace. Alternatively, the first densification may take place by fast pass-through and further stages by a batch process.

As will be explained later in this specification, tests using X-ray diffraction techniques on final samples with large crystals have shown that these crystals are of the lower resistivity $\beta''$ phase. Tests have shown that the cool down after the first peak temperature reduces or eliminates grain growth while still permitting the phase conversion from the $\beta$ to the $\beta''$ phase to continue. The continuation of the phase conversion results in the formation of further $\beta''$ nucleation sites and thus, in the subsequent sintering operation there is less tendency for grain growth.

Thus, in accordance with another aspect of this invention, in the manufacture of an article of polycrystalline beta-alumina, after firing to give partial densification such that the linear shrinkage is between 5% and 95% of that responsible for complete densification, there is carried out a heat treatment to increase the proportion of $\beta''$ to $\beta$ phase with minimum effect on the grain growth and, after this heat treatment, the article is further fired to complete the densification. This heat treatment after the partial densification and before the final sintering stage may typically be for a period of 1 to 24 hours. The temperature during the period before the final sintering is preferably below the temperature at which the partial densification is effected. Typically this heat treatment might be in the range of 1200° C. to 1650° C. and more particularly in the range of 1400° C. to 1600° C. This further heat treatment before the final sintering, in practice, may be the maintenance of the material at a temperature sufficiently below the sintering temperature to minimise grain growth and for a sufficient time to permit the development of the $\beta''$ phase.

An unexpected benefit of the method of this invention is the substantial reduction of the population of large grains in the final ceramic body. This has been found for the application of the method to fast firing and batch firing methods. Better microstructural control in combination with lower resistivity derived from a higher degree of conversion to the $\beta''$ variant of beta-alumina is also obtained. As indicated above, the reduction in population of large grains arises from the increased proportion of $\beta''$ phase. There are thus more sites for nucleation thereby tending to limit the incidence of growth of large grains.

In carrying out the invention using batch firing in a closed crucible, a firing schedule for sintering beta-alumina may comprise a temperature rise to a first peak temperature between 1450° C. and 1600° C., then cooling, then a reheat to a second peak temperature which is at least 10° C. higher than the first peak temperature, but which does not exceed 1900° C., to complete sintering, then cooling, the rate of heating to the first peak temperature and of the subsequent cooling being such that between 5% and 95% of the overall linear shrinkage occurs in this cycle.

The slowing down of the rate of sintering by the cooling step after the first peak temperature and before completion of sintering and the subsequent reheat to complete the sintering results in a final beta-alumina product, which has a uniformly small grain size, with the notable absence of isolated large stress-raising crystals that have an adverse effect on strength. The optimum grain size distribution can be achieved by selection of an optimum first peak temperature in the specified range.

It has been found that, for a batch firing technique, the optimum first peak temperature is lower (e.g. 1490°–1530° C.) for magnesia-containing beta-alumina compositions (e.g. compositions with 2% MgO or with 2% MgO plus 0.5% $Li_2O$) than for non-magnesia or low magnesia beta-alumina compositions (e.g. with 0.5–0.9% $Li_2O$ or with 0.1–0.5% MgO+0.5–0.9% $Li_2O$) where the optimum first peak temperature is typically 1525°–1555° C., possibly because of the lower temperature at which sintering commences for magnesia-containing compositions. It has also be found that for magnesia-containing compositions the optimum first peak temperature is lower the higher the magnesia content, and that for both magnesia-containing and non-magnesia compositions, variation of the lithia content does not significantly alter the optimum first peak temperature.

The second peak temperature is selected so that sintering of the beta-alumina is essentially completed by the time it is reached. As a general rule it is advantageous to reach the second peak temperature as quickly as possible and to hold at that temperature for the shortest possible time, with the aim of restricting crystal growth. Whilst it is, therefore, possible to choose a relatively low second peak temperature and to allow a relatively long approach time to this temperature in order to complete sintering, it is advantageous to choose a high second peak temperature and a fast approach time to this temperature. The second peak temperature is preferably between 1500° C. and 1650° C.

It is advantageous that the cooling step after the second peak temperature is as rapid as possible, since a slow cool down might effectively extend the time at the second peak temperature at which stage diffusion/crystal growth is progressing at a maximum rate.

As has been previously implied, the temperature values are related to the degree of sintering achieved, and the invention can, therefore, be considered from another aspect. According to this second aspect a firing schedule for sintering beta-alumina is used, which comprises a temperature rise to a first peak temperature at which between 40% and 70% of sintering has been achieved, then cooling, then a reheat to a second peak temperature at least 10° C. higher than the first peak temperature in order to complete sintering, and then cooling.

Following the expansion occurring during the formation of beta-alumina, the degree of sintering is directly proportional to the degree of shrinkage, i.e. 50% sintering is equivalent to 50% of maximum shrinkage. If, therefore, the total shrinkage is 12% of the original body at the start of sintering 50% of maximum shrinkage represents 6% shrinkage in absolute terms.

Preferably, the temperature rise to the first peak temperature is such that about 50% sintering has been achieved.

The heating rate up to 1400° C. is relatively unimportant provided that it is within acceptable ceramic practice not to damage the material, e.g. through thermal shock due to too rapid heating.

Advantageously, the temperature rise between about 1400° C. and the first peak temperature is at a rate of 70° C. per hour, the cooling after the first peak temperature is at a rate of at least 40° C. per hour, e.g. 120° C. per hour. During the reheat, the temperature rise is preferably at least 40° C. per hour, preferably about 120° C. per hour.

As previously mentioned, the present invention may be used with a fast firing technique. Fast firing is described and claimed in U.S. Pat. Nos. 3,950,463, 4,059,663 and 4,070,542 the sintering being effected by passing the shape of compressed powdered material through a furnace so that each part of the article, as it passes through the furnace, is rapidly raised to the sintering temperature.

The present invention includes within its scope a method of producing an article of polycrystalline beta-alumina, wherein the sintering of a compressed powdered shape is effected by passing the compressed shape through a fast-firing furnace to sinter the material, allowing it to cool to a temperature below the sintering temperature and then passing it again through a fast-firing furnace to raise the temperature of the shape to a sintering temperature and to complete sintering, the temperature of the article in the sintering zone in the first pass being between 1450° and 1725° C. and the temperature in the sintering zone in the second pass being between 1550° and 1800° C., the second pass having a temperature between 25° and 250° C. higher than the first pass, the rate of movement through the furnace being such that between 5% and 95% of the overall linear shrinkage occurs in the first pass through the furnace.

The cooling between the stages may be to room temperature, but this is not essential so long as the cooling is to a temperature below the sintering temperature, e.g. to a temperature below 1500° C. and at least 25° below the firing temperature of the preceding stage. Typically the cooling is to about 1300° C.

Two separate zone sintering furnaces may be used or a single pass-through furnace with a double peaked hot zone.

The rate of movement through the furnace is preferably such that the heating of the article, as it moves into the furnace, is at a rate greater than 200° C. per minute. The dimensions of the furnace are preferably such that, in each stage, the duration at the sintering temperature is less than 3 minutes.

As explained above, by this double firing technique, it has been found that there is a marked reduction in the percentage of large grains in the fired article. This fast-firing technique using an interrupted sintering cycle results in the same high sintered density as is obtained with fast-firing of beta-alumina using a single pass through the furnace, as is explained in the aforementioned specifications. The advantage of the interrupted firing technique lies in the improved ceramic microstructure. Beta alumina tends to have a duplex microstructure with a fine grained matrix containing a proportion of grains of exaggerated growth, having a size one to two orders of magnitude greater than the matrix. These large grains are deleterious to the mechanical properties of the material because the conduction plane is also an easy cleavage plane.

The fast-firing technique in which the article is rapidly brought up to the sintering temperature in itself helps to restrict crystal growth. It has been found, however, that the interrupted firing as described above does give even further improvement in that it reduces the proportion of the material having large grain.

It is preferred to use a maximum temperature of 1500° to 1625° C. for the first firing and a temperature in the range 1650° to 1775° C. for the second firing, the second firing being at a temperature of 100° to 200° greater than the first firing, the temperature in each case being above the sintering temperature; the sintering temperature is defined as the temperature of onset of sintering. The optimum temperatures may be found empirically. As is well-known in this art, the sintering temperature depends on the ceramic composition, but may readily be determined empirically. With a high sodium oxide content and/or a high lithium oxide content, the sintering temperature may be below 1600° C., and with some compositions it is possible to carry out the sintering operation at a temperature as low as 1500° C. For other compositions, however, the sintering temperature may be 1700° C. or above. In carrying out a sintering operation, in both stages, the temperature is above the sintering temperature, and thus sintering is effected in each of these two stages.

In a furnace having a heating zone 150 mm long, the article may be moved through the furnace at a speed between 20 and 100 mm/minute, but preferably between 35 and 85 mm/minute.

In the known way, before sintering (either by batch firing or by fast firing), the green shape may be pre-fired at a temperature below the sintering temperature. This pre-firing is typically at a temperature of 700° to 900° C. and for a period of 4 to 5 hours. After sintering, the article may be annealed (as described and claimed in U.S. Pat. No. 3,903,225) by heating for at least 1 hour to a temperature between 1200° C. and 1600° C., but preferably between 1300° C. and 1500° C., this temperature being at least 50° below the minimum sintering temperature for the composition employed.

DESCRIPTION OF THE PREFERRED EMBODIMENTS

Figure 1:
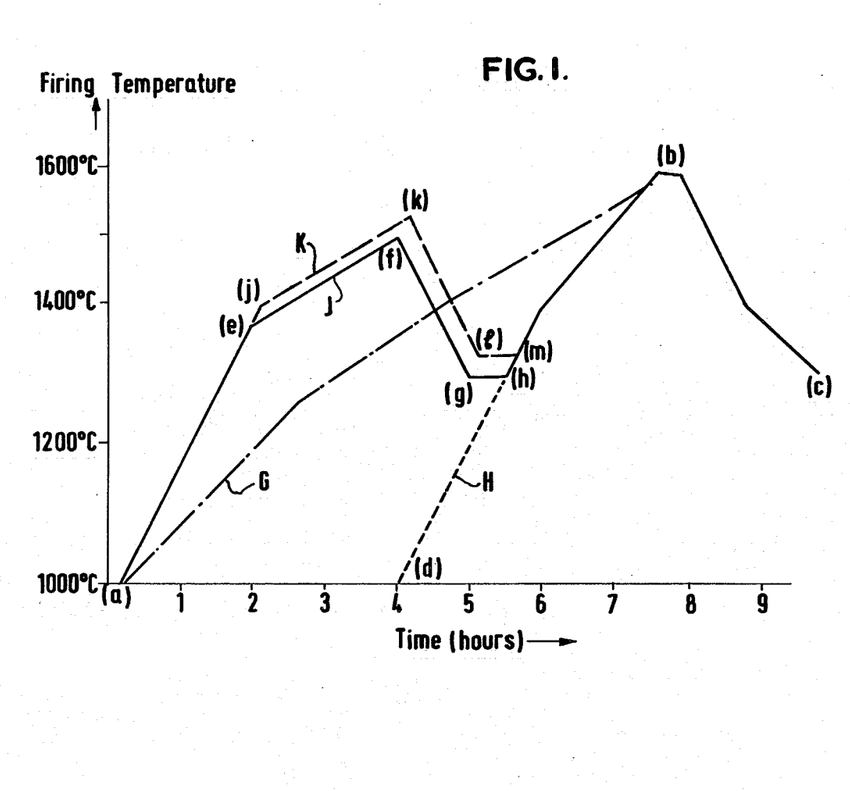
FIG. 1 shows four firing schedules for a magnesia containing beta-alumina composition, two of which relate to reference examples not in accordance with the invention and two which are in accordance with the invention.

The beta-alumina compositions produced in accordance with the firing schedules of FIG. 1 uses a mix comprising, by weight:

| | |
|---|---|
| $Al_2O_3$ | 88.6% |
| $Na_2O$ | 8.9% |
| $Li_2O$ | 0.5% |
| $MgO$ | 2.0% |

The oxide materials were wet-milled in a rubberlined ball mill, using suitable fine and reactive forms of alumina and magnesia, present as solids, with the sodium and lithium present in soluble form as hydroxides. After milling for 2 hours, the material was vacuum dried before grinding to less than 200 mesh in a hammer mill. After further sieving, a binder was added to enable green shapes to be made by isostatic pressing. These green shapes, in this and all the other examples described, was in the form of a tube closed at one end.

These green shapes were then fired in a closed crucible formed of magnesia.

Figure 2:
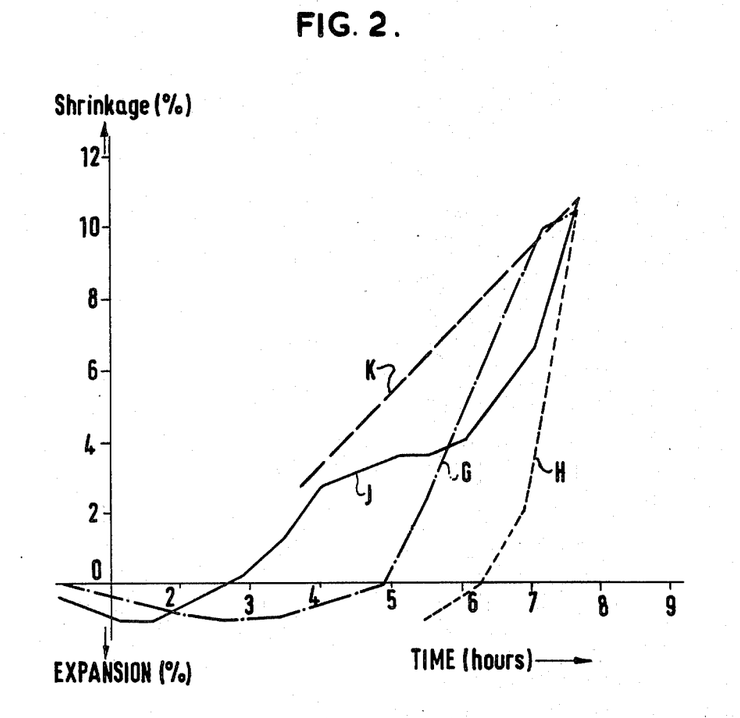
FIG. 2 shows the percentage shrinkage with time using the firing schedules shown in FIG. 1.

Referring to FIG. 1, the part of the firing schedules shown is from 1000° C., so that they each show the part of the firing schedule in which the beta-alumina is formed (resulting in the expansions shown in FIG. 2) and the sintering cycle (resulting in the shrinkage also shown in FIG. 2).

Schedules G and H are the reference examples and in these the temperature is continuously raised from the 1000° C. to about 1600° C. the temperature gradient for curve H being steeper than that for curve G. Thus schedule G extends from points (a) to (b) and schedule H from points (d) to (b). Thereafter there is a short hold of about 15 minutes and cooling to point (c) to complete the sintering. The sintered beta-alumina is then cooled relatively rapidly.

Schedules J and K are in accordance with the invention. Schedule J follows the line through points (a), (e), (f), (g), (h), (b) and then cools along line (b) (c). Firing schedule K is the same shape and follows the line through points (a), (j), (k), (l), (m), (b) and then cools along line (b) (c). Thus, in both schedules J and K the temperature rises from 1000° C. to 1400° C. in about 2 hours. Then in the next two hours to about 1500° C. Cooling then takes place in the next hour to approximately 1300° C. After a short residence at this level, the temperature is then raised again to 1600° C. in the next 2 hours. Thereafter there is cooling down to 1300° C. in two hours.

Referring to FIG. 2, it will be seen that the shrinkage rate occurring during the major part of the sintering portions of firing schedules G and H is high as compared with those of firing schedules J and K. The following table sets the relationshp between firing schedule, bulk density and crystal size.

| Firing Schedule. | Bulk Density. gcm$^{-3}$ | Crystal Size. |
| --- | --- | --- |
| G | 3.19 | small, medium and large |
| H | 3.19 | small and large |
| J | 3.18 | small and very small |
| K | 3.18 | small and very small |

In the context of this application, large crystals are considered as being of greater than 25 microns in size, medium as being between 5 and 25 microns in size, small as being between 1 and 5 microns in size and very small as being less than 1 micron in size.

Fracture tests carried out on the samples produced according to firing schedules G, J and K showed that the samples produced by firing schedules J and K withstood a fracture stress about twice that for the samples produced by firing schedule G.

The beta-alumina produced using all four firing schedules shown in FIG. 1 had an ionic resistivity of 3 to 5 ohms cm at 350° C.

Figure 3:
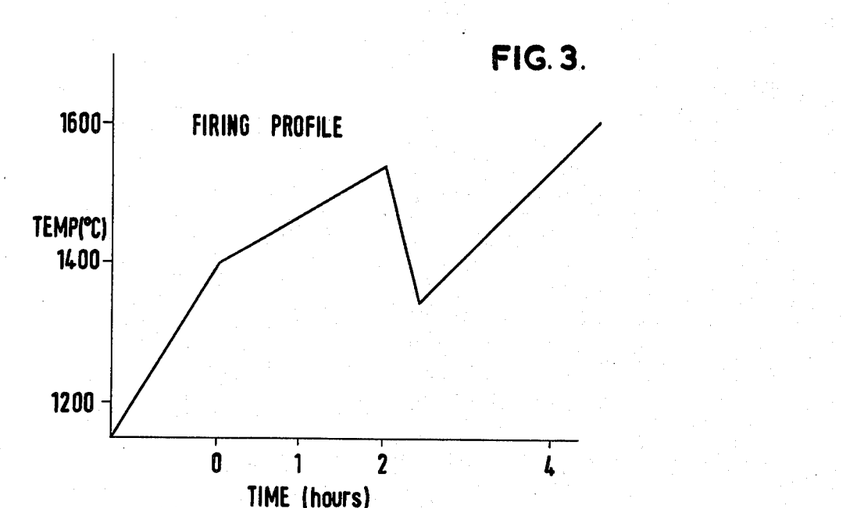
FIG. 3 shows a firing schedule for a non-magnesia beta-alumina composition.

Referring to FIG. 3, this shows a firing schedule for a non-magnesia beta-alumina composition prepared by wet mixing and spray dried to form a powder comprising by weight:

| | |
| --- | --- |
| Al$_2$O$_3$ | 90.2% |
| Na$_2$O | 9.0% |
| Li$_2$O | 0.8% |

It will be seen that the firing schedule has a similar shape to firing schedules J and K of FIG. 1, but having higher first and second peak temperatures. The cool down after the second peak temperature is not shown in FIG. 3, but will correspond substantially to that shown in FIG. 1.

Figure 4:
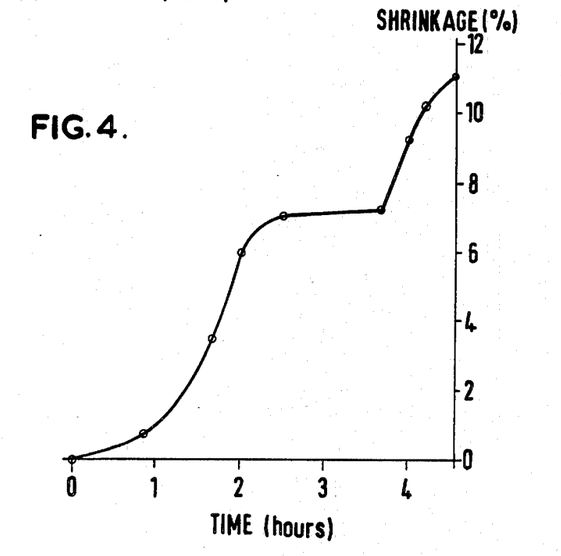
FIG. 4 shows, similarly to FIG. 2, the percentage shrinkage using the firing schedule of FIG. 3.

FIG. 4 shows the percentage shrinkage against time for the firing schedule of FIG. 3, and it will be realised that about 50% of maximum shrinkage equivalent to 50% of sintering has been achieved at the first peak temperature. The same applies to firing schedules of J and K of FIGS. 1 and 2.

The strength and other characteristics of the beta-alumina produced by the firing schedule of FIG. 3 can be appreciated from the following Table 1 which shows the relative characteristics for different first peak temperatures for the non-magnesia Beta-alumina composition quoted above. The strength measurements represent the average for a number of samples. The second peak temperature was 1610° C.

TABLE 1.

| Test No. | First peak temp (°C.) | Strength (N/mm$^2$) | Resistivity 350° C. (ohm cm) | *%B″ | **Crystal size. |
| --- | --- | --- | --- | --- | --- |
| 1 | 1500 | 181.8 | 4.94 | 80 | s/trm |
| 2 | 1512 | 196.7 | 5.06 | 80 | s/trm |
| 3 | 1522 | 224.9 | 4.88 | — | — |
| 4 | 1535 | 253.1 | 4.80 | 90+ | s |
| 5 | 1542 | 245.8 | 4.60 | 85 | s/trm |
| 6 | 1545 | 243.6 | 4.40 | — | — |
| 7 | 1553 | 226.0 | 4.23 | 95+ | s/fm |
| 8 | 1556 | 209.0 | 3.92 | 90 | s/fm |
| 9 | 1562 | 198.0 | 3.77 | — | — |
| 10 | 1575 | 193.1 | 3.72 | 95 | s/fm. |

* B″ = Na Al$_5$O$_8$ type beta-alumina.
** s = small.
tm = trace medium.
fm = few medium.

It will be seen that No. 5 represents the characteristics of the product produced by the firing schedule shown in FIG. 3.

The following Table 2 illustrates the importance to the strength characteristics of having a first peak temperature rather than firing straight through to the final temperature and of a cool down after the first peak temperature rather than a hold at that temperature.

TABLE 2

| | Strength in N/mm$^2$ | | |
| --- | --- | --- | --- |
| | Firing Profile | Hold at 1535° C. | Straight |
| Sample No. 1 Final Temperature 1605° C. | as in FIG. 3 with first peak at 1545° C. | | to final temperature |
| | 210.8 | 181.3 | 187.4 |
| Sample No. 2 Final Temperature 1610° C. | Firing profile as in FIG. 3 with first peak at 1545° C. | Hold at 1540° C. | Straight to final temperature |
| | 243.6 | 163.2 | 185.4 |
| Sample | Firing profile | | Straight |

TABLE 2-continued

| | Strength in N/mm² | |
|---|---|---|
| No. 3 Final Temperature 1625° C. | as in FIG. 3 with First peak at 1545° C. | to final temperature |
| | — | |
| | 204.4 | 127 |

The above table shows in three columns, firstly the strength using the firing profile of FIG. 3, secondly the strength, if the material is brought to a first temperature and then held at that temperature for 1 to 1½ hours before raising to the final temperature and, thirdly, the strength if the material is heated directly to the final temperature. It will be seen that, in each case, there is a significant improvement in strength by using the firing profile of FIG. 3.

It has been found that for magnesia-containing compositions the variation in the start of sintering is between 1380° C. and 1330° C. for magnesia contents of between 0.5% by weight and 2.0% by weight. For non-magnesia compositions the start of sintering is at about 1400° C.

Tests have been carried out with part firing of the material, measurement being made of shrinkage and of the $\beta''$ content using a first peak of 1500° C. The firing schedule was similar to that shown in FIG. 3. The phase conversion from $\beta$ to $\beta''$ phase proceeds during the cool down portion of the cycle after the first peak. The measurements of the $\beta''$ content and shrinkage were, therefore, made after the first peak and also when the same temperature, i.e. 1500° C., was reached on the approach to the final temperature. These tests showed that 5% of the total shrinkage occurred between the two measurements whereas the $\beta''$ content increased from 35% to 55%. In these tests the final peak temperature was 1605° C. and the final amount of $\beta''$ was 90%.

The slow down of the shrinkage when the material is cooled between the two peaks suggests the reduction or possible cessation of crystal growth although the phase conversion is still proceeding. The increase of $\beta''$ during this period provides more sites for nucleation and hence tends to limit the incidence of growth of large grains which, as previously explained, are of the $\beta''$ phase.

The following is a description of a number of examples of the invention making use of a fast-firing technique.

Table 3 below shows a number of examples of the sintering of beta-alumina using a composition by weight of 8.6% Na₂O, 1% MgO, 0.5% Li₂O balance Al₂O₃. The appropriate proportions of alpha alumina, sodium aluminate, magnesia and lithium carbonate were used as starting materials, these materials being mixed and dry-milled together to form a fine powder and then isostatically pressed to form a green compact. In all these examples, this compact comprised a tube closed at one end. This compact was pre-fired at 900° C. for 4½ hours and the pre-fired article was then sintered. Table 3 sets forth the conditions for sintering for a number of different tubes. Tube No. 18 is a control specimen, which was sintered at 1702° C., being passed through the sintering furnace at a speed of 40 mm/minute in a single firing stage. These are conditions known to give good results for this material with a single firing stage. The resultant density is shown as 3230 kg/m³ and the percentage of large grain as determined from an optical micrograph in an area of 0.15 mm² was 7.5. Large grains were arbitrarily defined as larger than 5×10 μm, but examination of the microphotographs clearly show the majority of large grains are substantially larger than this lower limit.

Tubes 1 to 17 in the table were subjected to a two-stage sintering process. In all these examples, the tube was cooled to room temperature after the first stage of sintering. Tubes 1, 2 and 3 in Table 3 are not examples of the invention in that the first and second firings were at substantially the same temperature. It will be seen, however, that the interrupted firing gave a slight reduction in the percentage of large grains and no significant change in the final density.

Tubes Nos. 4 to 13 are examples of the preferred conditions of the present invention in which the second firing was at the known optimum temperature for the material (approximately 1700° C.) to which there is a first firing at a temperature above the sintering temperature but at least 50° below the temperature of the second firing. It will be seen that in all these examples, a high density was obtained for the final article together with a small percentage of large grains. Tubes 15, 16 and 17 in Table 3 are examples of tubes in which the second firing was at a slightly higher temperature namely 1725° C. It is known that the higher temperature will tend to produce larger grain size. These examples should be compared with Examples 19, 20 and 21 which are controls having a single firing under the same conditions as the second firing stage of Tubes 15, 16 and 17. It will be seen, particularly with the lower speeds of traverse through the furnace, that is to say with the longer duration at the sintering temperature, the interrupted firing technique gave a much smaller percentage of large grain compared with the controls at these same speeds of traverse.

TABLE 3

| | FIRST FIRING | | | | SECOND FIRING | | | | | |
|---|---|---|---|---|---|---|---|---|---|---|
| Tube | Sintering Temperature (°C.) | Sintering Speed (mm/min) | Shrinkage (%) | Density (kg/m³) | Sintering Temp (°C.) | Sintering Speed (mm/min) | Shrinkage (%) Increase | (Total) | Density (kg/m³) | Percentage Large Grains |
| 1 | 1703 | 65 | 11.73 | — | 1702 | 40 | 0.21 | (11.92) | 3230 | |
| 2 | 1703 | 65 | 11.90 | — | 1702 | 40 | 0.21 | (12.08) | 3229 | |
| 3 | 1703 | 65 | 12.27 | — | 1702 | 40 | 0 | (12.27) | 3228 | 6.1 |
| 18 | 1702 | 40 | 11.75 | 3230 | Control(3) | | | | | 7.5 |
| 4 | 1651 | 65 | 10.67 | — | 1702 | 40 | 0.42 | (11.05) | 3239 | |
| 5 | 1651 | 65 | 10.34 | — | 1702 | 40 | 0.63 | (11.40) | 3241 | |
| 6 | 1651 | 65 | 11.21 | — | 1702 | 40 | 0.63 | (11.78) | 3230 | 1.8 |
| 7 | 1622 | 65 | 10.04 | — | 1702 | 40 | 1.04 | (11.03) | 3239 | |
| 8 | 1622 | 65 | 10.63 | — | 1702 | 40 | 1.25 | (11.79) | 3242 | |
| 9 | 1622 | 65 | 10.80 | — | 1702 | 40 | 0.84 | (11.55) | 3230 | 1.0 |
| 10 | 1558 | 65 | 7.45 | — | 1702 | 40 | 3.33 | (10.67) | 3237 | |
| 11 | 1558 | 65 | 7.46 | — | 1702 | 40 | 4.42 | (11.73) | 3234 | |
| 12 | 1558 | 65 | 7.46 | — | 1702 | 40 | 4.45 | (11.76) | 3232 | 1.2 |

TABLE 3-continued

| | FIRST FIRING | | | | SECOND FIRING | | | | |
| --- | --- | --- | --- | --- | --- | --- | --- | --- | --- |
| Tube | Sintering Temperature (°C.) | Sintering Speed (mm/min) | Shrinkage (%) | Density (kg/m³) | Sintering Temp (°C.) | Sintering Speed (mm/min) | Shrinkage (%) Increase (Total) | | Density (kg/m³) | Percentage Large Grains |
| 13 | 1544 | 65 | 5.04 | — | 1702 | 40 | 5.84 | (10.59) | 3240 | 0.2 |
| 14 | 1544 | 65 | 5.05 | — | Fractured | | | | | |
| 15 | 1544 | 65 | 5.23 | — | 1725 | 35 | 8.88 | (13.65) | 3232 | 7.8 |
| 16 | 1544 | 65 | 5.60 | — | 1725 | 45 | 6.72 | (11.94) | 3228 | 2.8 |
| 17 | 1544 | 65 | 4.67 | — | 1725 | 55 | — | — | 3231 | 1.1 |
| 19 | 1725 | 35 | 11.64 | 3236 | Control(15) | | | | | 17.0 |
| 20 | 1725 | 45 | 11.00 | 32.36 | Control(16) | | | | | 4.7 |
| 21 | 1725 | 55 | 11.62 | 3231 | Control(17) | | | | | 1.2 |

Table 4 relates to another series of tests and shows the effect of multiple firings on two tubes 1 and 2 in which material of the composition by weight 8% $Na_2O$, 2% MgO, balance $Al_2O_3$ in the form of sodium hydroxide, magnesium oxide and alumina was finely powdered by wet milling, spray dried, and isostatically pressed into a green shape. This shape was again a tube closed at one end. The green shapes were pre-fired at 900° C. for 5 hours. The tubes were then sintered repeatedly, tube No. 1 being fired four times under the conditions shown in the table and tube No. 2 fired three times under the conditions shown in the table. It will be seen that tube No. 1 after the second firing showed only 0.7% of large grains. This is an example of the invention, the first firing being at a temperature of 1625° C. and the second firing at a temperature of 1725° C. Subsequent firing increased the percentage of large grains without changing the density. Tube No. 2 is not an example of the invention, the first firing being at a temperature of 1725° C. which is the optimum sintering temperature for this composition. It will be seen that the interrupted firing gave a relatively large proportion of large grain after the second and third firings. The temperature of 1725° C. was chosen for the sintering in this example as this was known to be the optimum sintering temperature for fast-firing of beta alumina of this particular composition.

the second, third and fourth heat cycles was 0.7%, 5.4% and 10.8% respectively.

This result may be compared with a control experiment not in accordance with this invention in which another tube, No. 2 in Table 4, was densified by passing through a furnace just 3 times at a speed of 40 mm per minute and at a peak temperature of 1725° C. Again, the linear shrinkage necessary to produce mature densifications was about 11%. 98.6% of this shrinkage took place in the first cycle and 1.4% took place in the second cycle. The sample expanded slightly in the third cycle, which is often observed when gross secondary recrystallisation takes place. The percentage of large grains present after these firings was 2.9%, 23.4% and 44.1%, respectively.

Referring to Table 3, in another example of the invention three tubes (6, 9 and 12) were densified by passing each of them twice through the furnace. The first tube (6) was passed through a peak temperature of 1651 at a speed of 65 mm per min. and 94.6% of the 11.5% shrinkage required for mature densification took place. It was then passed through a peak temperature of 1702° C. at a speed of 40 mm per minute to complete sintering to a density of 3240 kg/m³.

The percentage of large grains present was only 1.8%.

The second tube No. 9 of Table 3 was first passed

TABLE 4

| Tube Firing Number | | (°C.) | Sintering Temperature Speed (mm/min) | Sintering Increment | Shrinkage (%) (Total) | Density (kg/m³) | Percentage of large grains |
| --- | --- | --- | --- | --- | --- | --- | --- |
| 1 | 1 | | 1625 | 40 | — | (8.9) | — | — |
| | 2 | | 1725 | 40 | 1.8 | (10.7) | 3220 | 0.7 |
| | 3 | 1725 | 40 | 0.9 | (11.6) | 3230 | 5.4 |
| (B016) | 4 | | 1725 | 40 | 0.7 | (12.3) | 3230 | 10.8 |
| 2 | 1 | | 1725 | 40 | — | (10.9) | 3220 | 2.9 |
| | 2 | | 1725 | 40 | 1.4 | (12.3) | 3235 | 23.4 |
| (B016) | 3 | | 1725 | 40 | 0.7 | (13.0) | 3227 | 44.1 |

The ceramic tube No. 1 in Table 4 was densified in accordance with this invention by passing through a furnace four times as described above. Each time the rate of passage was 40 mm per minute. The peak temperature during the first pass was 1625° C. and during the next three passes the peak temperature was 1725° C. The linear shrinkage required to produce mature densification was about 11%. It was found that 82% of the shrinkage took place during the first heat cycle, 17% took place in the second heat cycle, 1% took place in the third heat cycle. No shrinkage took place in the final heat cycle. The percentage of large grains present after through a peak temperature of 1622° C. at a speed of 65 mm per minute. 93.5% of the 11.55% linear shrinkage required for mature densification took place in this cycle. It was then passed through a peak temperature of 1702° C. at a speed of 40 mm per minute to complete sintering to a density of 3230 kg/m³. The percentage of large grains present in the final product was only 1.0%.

The third tube No. 12 of Table 3 was first passed through a peak temperature of 1558 at a speed of 65 mm per minute. 65.2% of the linear shrinkage required for mature densification took place in this cycle. It was then passed through a peak temperature at a speed of 40 mm per minute to complete sintering to a density of 3232 kg/m³. The percentage of large grains in the final product was only 1.2%.

The results of these three tubes Nos. 6, 9 and 12 of Table 3 may be compared with another sample, in which all of the shrinkage required to produce a density of 3230 kg/m³ took place during a single cycle of heating followed by cooling during passage through a maximum temperature of 1702° C. at a rate of 40 mm per minute. This method which is not in accordance with this invention produced a crystal structure comprising 7.5% of large grains.

In a further example of the method of this invention a tube No. 13 of Table 3 was passed through a hot zone having a peak temperature of 1544° C. at a rate of 65 mm per minute and this caused 43.5% of the linear shrinkage necessary to produce complete densification. Sintering was then completed by passing the tube through a zone having a peak temperature of 1702° C. at a speed of 40 mm per minute. The amount of recrystallization was almost undetectable at 0.2%.

In the production of beta-alumina articles for use as an electrolyte, for example, in a sodium sulphur cell or other energy conversion device, as previously explained, the articles are preferably annealed after the firing stage. This annealing is carried out at a temperature at least 50° C. below the minimum sintering temperature but at a temperature between 1200° C. and 1600° C. The annealing is effected for at least one hour but more typically it might be 24 hours. This gives a further improvement in the conductivity of the material as is explained in the aforementioned U.S. Pat. No. 3,903,225. The annealing operation preferably is carried out in a closed crucible, the article being buffered using powdered material of substantially the same composition as the beta alumina for the article.

In each of the examples making use of fast firing, the sintering was effected in an induction heated electrical furnace as described in U.S. Pat. No. 4,070,542. The furnace has an upward slope in the direction of movement of the articles through the furnace, to give a slight convective airflow through the furnace so as to prevent any condensation of water vapour onto the cold article entering the furnace and to maintain the sodium-oxide atmosphere around the article as it passes through the sintering zone, as explained in U.S. Pat. No. 4,059,663.

I claim:

1. A method of manufacturing an impervious polycrystalline cationically conductive beta-alumina article, said method comprising
   sintering a compact of beta-alumina particles or a compact of particles that react together before or during sintering to form beta-alumina;
   said sintering being conducted in successive cycles, each cycle comprising heating to a temperature above the sintering temperature followed by cooling of at least 25° C., wherein there is partial sintering in each cycle and completion of sintering in a last cycle; and
   wherein said heating and said cooling are carried out at temperatures and for times sufficient to densify said article; and
   wherein grain growth is reduced or eliminated while permitting phase conversion from β to β″ phase to continue by cooling between periods of partial sintering;
   and further wherein not more than 95% of overall linear shrinkage occurring during said sintering takes place during any one cycle of heating followed by cooling.

2. A method as claimed in claim 1 wherein at least 5% of the overall linear shrinkage occurs in each cycle of heating and cooling for densifying the compact.

3. A method as claimed in claim 1 comprising the steps of forming a compact of beta-alumina particles or of particles that react together before or during sintering to form beta-alumina and sintering the compact to densify it by a succession of at least two cycles of heating to a temperature above the sintering temperature followed by cooling by at least 25° C., each cycle being such that not less than 5% and not more than 95% of the overall shrinkage during the whole of the sintering operation occurs in any one cycle.

4. A method as claimed in claim 1 comprising the steps of forming a compact of particles that react together before or during sintering to form beta-alumina and sintering the compact by a plurality of cycles of heating to a temperature above the sintering temperature followed by cooling by at least 25° C., in the first of which cycles the heating and cooling is such as to produce a linear shrinkage of at least 0.6% but not greater than 11.4%, further linear shrinkage of at least 0.6% and not greater than 11.4% being produced in the subsequent cycle or cycles.

5. A method as claimed in claim 1 comprising the steps of densifying a compact of beta-alumina particles by sintering using at least two cycles of heating to above the sintering temperature and cooling by at least 25° C. to produce a linear shrinkage of between 10% and 30%, the cycles being such that not more than 95% nor less than 5% of the overall shrinkage occurs in any one cycle.

6. A method as claimed in claim 1 wherein the cooling after a temperature maximum in each cycle before the last is at least 50° C.

7. A method as claimed in claim 1 wherein the shrinkage during a first heating and cooling cycle of the sintering is between 30 and 90% of the overall linear shrinkage.

8. A method as claimed in claim 1 wherein the shrinkage during a first heating and cooling cycle of the sintering is between 35% and 65% of the overall linear shrinkage.

9. A method as claimed in claim 1 and in which the beta-alumina is sintered in a closed crucible wherein a firing schedule is used, which comprises a temperature rise to a first peak temperature between 1450° C. and 1600° C., then cooling by at least 25° C., then a reheat to a second peak temperature, which is at least 10° C. higher than the first peak temperature, but which does not exceed 1900° C. to complete sintering, then cooling, the rate of heating to the first peak temperature and of the subsequent cooling being such that between 5% and 95% of the overall linear shrinkage occurs in this cycle.

10. A method as claimed in claim 9 and for manufacturing a beta-alumina containing about 2% by weight of magnesia with or without lithia, wherein the first peak temperature is between 1490° C. and 1530° C.

11. A method as claimed in claim 9 and for manufacturing a lithia-containing beta-alumina with up to 0.5% magnesia wherein the first peak temperature is between 1525° C. and 1555° C.

12. A method as claimed in claim 9 wherein the second peak temperature is between 1500° C. and 1650° C.

13. A method as claimed in claim 9 wherein at least one of the firing stages is effected as fast firing in a pass-through furnace and at least one other firing stage is effected by a batch type process.

14. A method as claimed in claim 9 wherein, in the temperature rise up to the first peak temperature, the temperature rise between about 1400° C. and the first peak temperature is at a rate of about 70° C. per hour.

15. A method as claimed in claim 9 wherein said cooling following the first peak temperature is at a rate of at least 60° C. per hour.

16. A method as claimed in claim 15 wherein said reheat is at a temperature rise of at least 40° C. per hour.

17. A method as claimed in claim 15 wherein said reheat is at a temperature rise of about 120° C. per hour.

18. A method as claimed in claim 1 comprising sintering beta-alumina, wherein a firing schedule is used which comprises a temperature rise to a first peak temperature at which between 40% and 70% of sintering has been achieved, then cooling by at least 25° C., then a reheat to a second peak temperature at least 10° C. higher than the first peak temperature in order to complete sintering, and then cooling.

19. A method as claimed in claim 18, wherein the first peak temperature is such that about 50% of sintering has been achieved.

20. A method as claimed in claim 1 wherein sintering of a compressed powder shape is effected by passing through a fast-firing furnace to sinter the material, allowing it to cool to a temperature below the sintering temperature and then passing it through a fast-firing furnace at least once again to complete the sintering, the successive cycles of heating and cooling being such that not more than 95% of the overall linear shrinkage takes place during any one cycle of heating followed by cooling.

21. A method as claimed in claim 1 wherein sintering of a compressed powdered shape is effected by passing the compressed shape through a fast-firing furnace to sinter the material, allowing it to cool to a temperature below the sintering temperature and then passing it again through a fast-firing furnace to raise the temperature of the shape to a sintering temperature and to complete sintering, the temperature of the article in the sintering zone in the first pass being between 1450° C. and 1725° C. and the temperature in the sintering zone in the second pass being between 1550° C. and 1800° C., the second pass having a temperature between 25° C. and 250° C. higher than the first stage, the rate of movement through the furnace being such that between 5% and 95% of the overall linear shrinkage occurs in the first pass through the furnace.

22. A method as claimed in claim 21 wherein the article is cooled between the stages to a temperature below 1500° C. and at least 25° C. below the firing temperature of the preceding stage.

23. A method as claimed in claim 21 wherein the sintering is effected in a single pass-through furnace with a double peaked hot zone.

24. A method as claimed in claim 21 wherein the rate of movement through the furnace is such that the heating of the article, as it moves into the furnace, is at a rate greater than 200° C. per minute.

25. A method as claimed in claim 21 wherein the dimensions of the furnace are such that, in each sintering stage, the duration at the sintering temperature is less than 3 minutes.

26. A method as claimed in claim 21 wherein a maximum temperature of 1500° C. to 1625° C. is employed for the first firing.

27. A method as claimed in claim 21 wherein a temperature of 1650° C. to 1775° C. is employed for the second firing, the second firing being at a temperature of 100° to 200° greater than the first firing.

28. A method as claimed in claim 1 wherein, before sintering, the green shape is pre-fired at a temperature below the sintering temperature.

29. A method as claimed in claim 28 wherein the pre-firing is at a temperature of 700° C. to 900° C. and for a period of 4 to 5 hours.

30. A method as claimed in claim 1 comprising the steps of firing to give partial densification, such that the linear shrinkage is between 5% and 95% of the total shrinkage, subjecting the material to a heat treatment of between 1 and 24 hours at a temperature to increase the proportion of $\beta$ to $\beta''$ with minimum effect on the grain growth and, after this heat treatment, firing the article to complete the densification.

31. A method as claimed in claim 30 wherein said heat treatment is at a temperature below the firing temperature employed to give said partial densification.

32. A method as claimed in claim 30 wherein said heat treatment is at a temperature between 1200° C. and 1650° C.

33. A method as claimed in claim 30 wherein said heat treatment is at a temperature between 1400° C. and 1600° C.

34. A method as claimed in claim 1 wherein after sintering, the article is annealed by heating for at least 1 hour to a temperature between 1200° C. and 1600° C., this temperature being at least 50° C. below the minimum sintering temperature for the composition employed.

* * * * *